Sept. 11, 1956  F. E. HODGSON  2,762,939
ELECTRIC DRIVE TRANSMISSION
Filed May 6, 1952

INVENTOR.
FRANK E. HODGSON.
BY
Eugene H. Knoblock
ATTORNEY.

United States Patent Office 2,762,939
Patented Sept. 11, 1956

2,762,939
ELECTRIC DRIVE TRANSMISSION
Frank E. Hodgson, Clay Township,
St. Joseph County, Ind.
Application May 6, 1952, Serial No. 286,344
7 Claims. (Cl. 310—102)

This invention relates to a drive transmission, and more particularly to a drive transmission adapted to automatically change the speed ratio between the driving and the driven member in response to the load upon the driven member.

The primary object of the invention is to provide a drive transmission operating electrically and capable of varying the speed ratio between the driving and driven members in response to load in a substantially infinite number of steps or increments between a starting ratio, in which the speed of the driving member is very high compared to the speed of the driven member, and an overdrive relation in which the speed of the driven member can overrun the speed of the driving member for operation free from restraint by the driving member.

A further object is to provide an electrical drive transmission constituting a generator and a motor which are arranged in a compact unit possessing high operating efficiency.

A further object is to provide a device of this character in which an electrical generator and motor are arranged concentrically and include a power driven annular generator rotor and a motor armature located within the generator rotor and electrically energized thereby.

Other objects will be apparent from the following specification.

Figure 1:
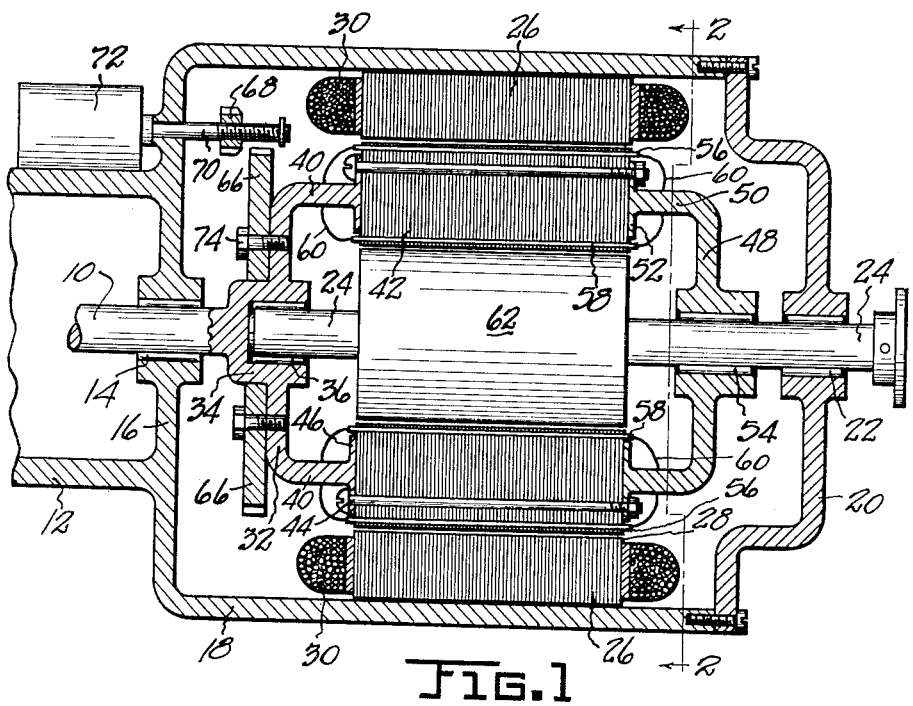
Fig. 1 is an axial sectional view of the device taken on line 1—1 of Fig. 2.

Referring to the drawing which illustrates one embodiment of my invention, the numeral 10 designates a drive shaft which is illustrated as disposed within a housing 12 mounting a bearing 14 in its end wall 16. A transmission housing 18 is preferably mounted on the housing 12 and receives the end of the shaft 10. The transmission housing includes an end wall 20 opposed to the end wall 16 which the shaft 10 enters, and the wall 20 mounts a bearing 22 in which a driven shaft 24 is journaled. The driven shaft is arranged concentrically and co-axially with the drive shaft 10.

Within the housing 18 is mounted a plurality of pole members 26 arranged in equispaced or equiangular relation to one another and preferably terminating in arcuate pole pieces 28. The pole members 26 are preferably laminated as shown. Each is provided with a winding 30, specifically a direct current winding, which windings will preferably be connected in series relation to each other and will be connected to a source of D. C. current, such as a battery (not shown). The inner faces of the pole pieces 28 will be concave and arcuate, and their arcuate curvature will preferably have a common center. The pole members may be of any number found suitable, and it will be understood that, while six poles are shown, this is illustrative and not intended to be limiting. The pole pieces will be spaced apart slightly in a circumferential direction and will be also circumferentially aligned.

The drive shaft 10 mounts a spider 32 at its end and preferably has a socket 34 formed at the center of said spider and in coaxial relation to the shaft 10. A bearing 36 may be received within the socket 34 to journal the inner end portion of the driven shaft 24. The spider 32 is rigid and preferably has openings 38 formed therein and defining fingers 40 therebetween, said fingers 40 being preferably substantially longitudinal and equispaced from the axis of the shaft 10, as best illustrated in Fig. 1. An annular rotor 42 is carried by the spider fingers 40 concentrically therewith. This rotor has an outer diameter slightly less than the inner diameter of the pole pieces 28 so as to fit with slight clearance within the space defined by said pole pieces. The annular member 42 preferably is laminated, and the laminations are held together by bolts 44 which also serve to secure said annular member to an anchoring flange 46 carried by the spider fingers 40. In order to stabilize the rotor 42, a second spider 48 is secured to the rotor 42, the same having fingers 50 flanged at 52 and secured by the bolts 44. The secondary or stabilizing spider 48 mounts a bearing 54 for receiving the shaft 24.

The rotor 42 is provided with windings which define one or more closed circuits and include connectors located at both the inner and outer surfaces of the annulus. The arrangement is such that rotation of the ring 42 will cause the generation of electrical current in the closed circuit windings. The windings may be formed in any manner found suitable and well understood in the art.

Figure 2:
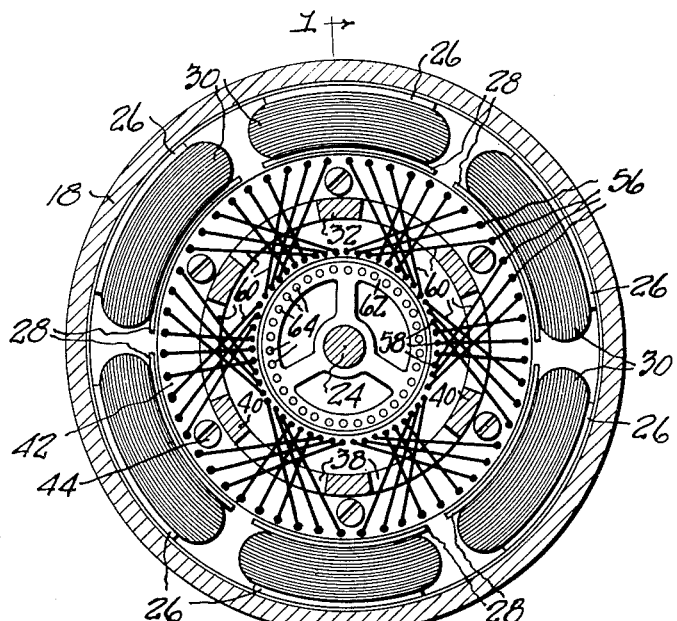
Fig. 2 is a transverse sectional view taken on line 2—2 of Fig. 1 and illustrating some of the parts schematically.

I have elected, for purposes of illustration only, to show said windings as including outer conductors 56 extending parallel to the axis of the rotor and equispaced from each other and from the center of the rotor, the same being located adjacent the outer periphery of the rotor. A second group of conductors 58, which I may call inner conductors, are carried by the rotor and extend longitudinally thereof, that is, parallel to its axis and equispaced from each other and from the axis adjacent the inner periphery of the ring. The outer conductors 56 and inner conductors 58 are interconnected in one or more closed circuits by conductors 60 in any suitable arrangement. As shown in Fig. 2, each outer conductor 56 may be paired with an inner conductor 58 and connected at opposite ends thereof with its paired conductors by conductors 60 so as to form closed loops. The number of windings upon the rotor, their arrangement, and their connections may vary as desired, the arrangement preferably being such that multiple phase alternating currents will be generated in said windings incident to rotation of the rotor within the electric field provided by the pole members 26 and their windings 30. It may be mentioned that the three-phase arrangement or winding shown in Fig. 2 is intended to be illustrative and is not intended to be limiting. Also, the rotor may be of the direct current construction, if desired, using commutators and brushes (not shown) in the manner well understood in the art.

The driven shaft 24 mounts an armature 62. This armature is illustrated herein out of its true size proportion to the other parts for purposes of convenience and in order to provide clarity of showing of the connections 60 between the various rotor conductors 56 and 58. In actual construction the rotor 42 will be thinner than is here illustrated, and the armature 62 will be of greater diameter than is here illustrated. In other words, assuming that the outer diameter of the rotor is correctly illustrated here, then the inner diameter of that rotor and the diameter of the armature are each shown much smaller than would be proper for a true proportion of the parts. The armature preferably will be of the squirrel cage type having a plurality of longitudinal conductors 64 imbedded therein adjacent its periphery and equispaced from each other and from the center of the armature in the manner well understood in the art.

In the operation of the device, when it is desired to establish a driving connection between the shafts 10 and 24, the field coils 30 will be energized. Rotation of the driving shaft 10 will cause the rotor 42 to revolve, with its conductors 56 thus cutting through the lines of magnetic flux produced in the pole pieces by the field windings. This result in generation of electrical current within the windings of the rotor, which current flows in closed circuits defined, in the form illustrated, by the conductors 56, 58 and 60, thus providing current flow in the inner conductors 58 which are disposed adjacent to the armature 62. As the rotor 42 revolves, the electrical current in the inner windings or conductors 58 acts upon the conductors 64 of the squirrel cage armature 62 to produce a motor action to rotate that armature and thereby rotate the shaft 24 on which it is carried.

The speed at which the driven shaft rotates will depend upon the load and the inertia of that shaft. Thus in starting, the inertia of the driven shaft and its load will result in slow initial starting rotation of the driven shaft 24. The speed of the driven shaft will increase progressively as the driving mechanism absorbs the starting load. After the driven device is placed in motion and attains desired speed, the output speed will remain constant as long as the load remains constant. The point at which the speed becomes constant will depend upon the electrical values of the device, the windings and the like. It is possible in a device of this character to provide an overdrive relation after the driven member has reached the same speed as the driving member. That is, the windings may be so arranged and so proportioned, electrically and mechanically, to the pole pieces and to the armature conductors as to cause the armature to overrun a drive shaft in the well known "overdrive" relation. This condition occurs only when the load is less than the power delivered. The overdrive ratio will have a predetermined maximum according to the electrical and mechanical constants of the device and may vary infinitely from that maximum to a speed ratio having a very high torque multiplication or speed reducing factor as is required at starting from a stationary position. The overdrive is limited in its ratio to the speed of the driving shaft and rotor. Consequently, when a condition occurs which involves a tendency of the driven shaft to rotate at a speed greater than the permitted maximum ratio mentioned, the device serves to build up a countertorque which serves to brake or slow down the speed of the driven shaft in proportion to the speed of the driving shaft.

If desired, the transmission may have associated therewith a starting mechanism for operating the prime mover. Thus, assuming that an automotive installation is desired and that the shaft 10 constitutes the drive shaft of an internal combustion engine, the spider 32 may mount a starter ring gear 66 which is adapted to be engaged by a starter gear 68 shiftable on the shaft 70 of a starter motor 72 between an inoperative position, as shown in Fig. 2, and an operative position in which said gears 66 and 68 mesh. It will be noted that the gear 66 is bolted at 74 to the spider 32 so that rotation of the starter motor 72 will cause rotation of the shaft 10 which mounts said spider 32. This provides a convenient and efficient location for an engine starter.

While the preferred embodiment of the invention has been illustrated and described herein, it will be understood that changes in the construction may be made within the scope of the appended claims without departing from the spirit of the invention.

I claim:

1. An electric drive transmission comprising an electrical generator having an annular rotor and a circular set of stationary pole pieces encircling said rotor and providing a D. C. field, said rotor having multiple polyphase closed circuit windings including conductor portions adjacent its inner and outer peripheries, a driving shaft connected to said rotor, a squirrel-cage motor armature rotatable concentrically of and within said rotor and having conductors adjacent to its outer periphery and excited by the inner rotor conductors, and a driven shaft fixedly connected to said armature.

2. An electric drive transmission for connecting a driving shaft and a driven shaft, comprising a housing, a plurality of flux generating poles fixedly carried by said housing and arranged in annular series, a rotor connected to said driving shaft and having inner and outer conductors connected in closed circuits and disposed in polyphase arrangement, said outer conductors passing through the flux generated by said poles, and a motor armature fixedly connected to said driven shaft and rotatable within and concentrically of said rotor, said armature having conductors inductively energized by said inner rotor conductors.

3. An electric drive transmission for connecting a driving shaft and a driven shaft, comprising a housing journaling said shafts in axial alignment, an annular series of circumferentially spaced flux generating poles fixed in said housing, an annular rotor journaled in said housing concentrically of and within said series of poles and fixedly connected to said driving shaft, a plurality of electrical conductors carried by said rotor and arranged to define a plurality of closed circuits, and a motor armature directly connected to said driven shaft concentric with and within said rotor and having a plurality of conductors inductively related to said rotor conductors, said rotor conductors being connected to generate polyphase alternating current upon rotation of said rotor.

4. An electric drive transmission for connecting a driving shaft and a driven shaft, comprising a housing journaling said shafts in axial alignment, an annular series of circumferentially spaced flux generating poles fixed in said housing, an annular rotor journaled in said housing concentrically of and within said series of poles and fixedly connected to said driving shaft, a plurality of electrical conductors carried by said rotor and arranged to define a plurality of closed circuits, and a motor armature fixedly connected to said driven shaft concentric with and within said rotor and having a plurality of conductors inductively related to the adjacent conductors of said rotor circuits, said flux generating poles each having a direct current winding, said rotor circuits being arranged to generate polyphase alternating current.

5. An electric drive transmission for connecting a driving shaft and a driven shaft, comprising a housing journaling said shafts in axial alignment, a plurality of circumferentially equispaced flux generating poles fixed in said housing, an annular rotor journaled in said housing concentrically of and spaced from the inner faces of said poles, a plurality of electrical conductors carried by said rotor and arranged to define a plurality of closed circuits, each circuit including a conductor adjacent the outer periphery of the rotor and a conductor adjacent the inner periphery of the rotor, and a motor armature carried by said driven shaft concentric with and within said rotor and having a plurality of conductors inductively related to the inner peripheral conductors of said rotor circuits, said driving shaft mounting a spider connected to said rotor and said driven shaft having a fixed connection with said armature.

6. An electric drive transmission as defined in claim 5, wherein a motor starter is carried by said housing and includes a pinion adapted to mesh with a gear carried by said spider.

7. An electric drive transmission as defined in claim 5, wherein a motor starter is carried by said housing and includes a part adapted for driving connection with said spider.

References Cited in the file of this patent

UNITED STATES PATENTS

| | | |
|---|---|---|
| 859,545 | Collins | July 9, 1907 |
| 1,158,243 | Lakey | Oct. 26, 1915 |
| 1,515,322 | Ahlm | Nov. 11, 1924 |
| 1,836,298 | Winther | Dec. 15, 1931 |
| 2,223,210 | Hefel | Nov. 26, 1940 |
| 2,563,577 | Bowes | Aug. 7, 1951 |